3,828,072
PROCESS FOR PREPARING COMPOUNDS OF THE BENZOTHIOXANTHENE SERIES

Ernst Spietschka, Oberauroff, Taunus, and Josef Landler, Hofheim, Taunus, Germany, assignors to Farbwerke Hoechst Aktiengesellschaft vormals Meister Lucius & Bruning, Frankfurt am Main, Germany
No Drawing. Filed July 10, 1972, Ser. No. 270,188
Claims priority, application Germany, July 10, 1971, P 21 34 517.5
Int. Cl. C07d 65/17
U.S. Cl. 260—328        5 Claims

ABSTRACT OF THE DISCLOSURE

Process for preparing compounds of the benzothioxanthene series, wherein compounds of the 1-(2'-aminophenylmercapto)-naphthalene series or of the 1-phenylmercapto-8-aminonaphthalene series are reacted in tertiary amines with compounds yielding nitrosyl groups and the diazonium compounds so obtained are heated. This process is suited for all compounds which contain the benzothioxanthene ring, independently of their substituents. The products obtained by this process have a markedly higher purity and are obtained in a higher yield as compared to other processes.

---

A series of compounds which contain the ring structure of benzothioxanthene of the formula

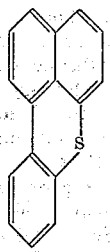

(1)

have gained increasing importance as disperse dyestuffs and as fluorescing dyestuffs or as precursor products for these dyestuffs. They can be obtained by diazotizing amines of the formulae

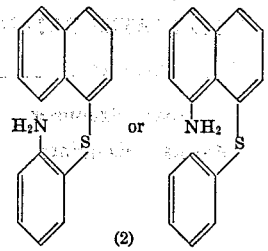

(2)    (3)

which contain suitable substituents, in dilute acetic acid and by heating in the presence of copper or copper salts. However, this treatment at the boil also leads, in addition to the desired products of the benzothioxanthene series, to side-products as for example the hydroxy compounds formed by the decomposition of the diazonium compound. However, for obtaining optimum fluorescence it is necessary that these dyestuffs are chemically very pure (Th. Förster, Fluoreszenz organischer Verbindungen 1951 page 181). The same applies to the brilliancy of dyeings produced with such dyestuffs. For this reason, it is necessary to purify the benzothioxanthene compound according to the known process additionally by extraction or recrystallization from an organic solvent.

Now, we have found that compounds of the benzothioxanthene series can be obtained by a single reaction step and with a high degree of purity by reacting compounds of the 1-(2'-aminophenylmercapto)-naphthalene series of the formula (2) or compounds of the 1-phenylmercapto-8-amino-napthalene series of the formula (3) in tertiary amines with compounds that yield the nitrosyl group and heating the diazonium compounds so obtained.

For carrying out the process of the invention, the starting compounds of the formulae (2) or (3) are dissolved or suspended, depending on their solubility, in the tertiary amine. As tertiary amines there may be used those which are inert to the reagent splitting-off nitrosyl groups used thereafter, for example pyridine, picoline, quinoline or isoquinoline. The type and the quantity of tertiary amine is determined by the solubility of the final product; best results are obtained in general with about the 5–10-fold quantity of tertiary amine. This solution or suspension is combined with molar amounts of a diazotizing agent splitting-off nitrosyl groups, for example nitrosyl chloride or nitrosyl sulfuric acid. The temperature used is in general in the range of from $-10°$ C. to $+10°$ C. Sometimes, a small excess of the diazotizing agent may be necessary to obtain complete diazotation. When diazotation is completed, the reaction mixture is heated to temperatures in the range of from $40°$ to $115°$ C. at which ring closure is effected. The temperature required for the ring closure depends on the reactivity of the diazonium compound, but in general the above-indicated temperatures are sufficient to cause complete ring closure.

The process of the invention is in general suited for preparing all compounds which contain the benzothioxanthene ring, independently of their substituents. Such compounds are described in French Patents 1,444,489, 1,470,793, 1,488,113, 1,489,487, 1,469,893, 2,089,619, 2,089,618 and 2,093,659.

The products obtained according to the process of the invention are distinguished by a markedly higher purity and they are obtained with a higher yield as compared to other processes. In addition thereto, the tertiary amines can be easily regenerated by distillation, which was difficult with the dilute acetic acid used in the known processes. Furthermore, the use of copper compounds is omitted: hitherto the copper compounds had to be removed from the mother liquor in a separate precipitating process in order to prevent contamination of the waste waters.

A further advantage is that a single boiler is required for the diazotization and ring closure, as compared to the process in which the dilute acetic acid is used. Furthermore, the reaction volumes are distinctly smaller, whereby the spacetime yields are more favorable.

It is surprising that diazotation in an excess of tertiary base is also possible with compounds which yield nitrosyl groups, since it was known up to now only to dissolve the amine to be diazotized in a tertiary base or to dissolve it therein and then to carry out diazotation with an excess amount of acid and sodium nitrite.

The following Examples illustrate the invention.

EXAMPLE 1

37 Parts by weight of nitrosyl-sulfuric acid (42%) were allowed to run, in the course of about 30 minutes, at $-10°$ C. to $0°$ C., into a suspension of 35.3 parts by weight of 3-(2'-aminophenylmercapto)-benzanthrone in 350 parts by weight of a commercial mixture of pyridine bases (composition: 70% of pyridine, 76% of methylpyridine, 4% of dimethylpyridine). After half an hour, the cooling apparatus was switched off and the whole was stirred for 2.5 to 3 hours at room temperature. To complete the reaction, the reaction mixture was heated slowly up to the boiling temperature of the mixture of pyridine bases (110 to $115°$ C.) and stirred for 3 hours. After cooling, the cyclization product was filtered-off with suction and washed with a mixture of pyridine bases until the effluent showed a light red colour. The resulting product was then dried in a hot-flue at 100° C. It is also possible first to introduce the mixture of pyridine bases and then to add, while stirring, at —10° C. to 0° C 37 parts by weight of 42% nitrosyl-sulfuric acid. Then, 35.3 parts by weight of 3-(2'-aminophenylmercapto)-benzanthrone are added and the process is further carried out as described above.

Nitrosyl chloride may be used in the same manner as diazotizing agent.

The dyestuff obtained in this manner, which corresponded to the formula

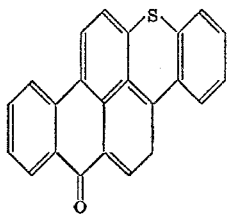

showed an extinction value, measured by photometry at 510 nm. which corresponded to 99–100% of the extinction value of a chemically pure product.

When prepared according to the method described in German Patent 1,293,939, the extinction value of this dyestuff under the same measuring conditions was 68% only.

EXAMPLE 2

32.1 Parts by weight of 4-(2'-aminophenylmercapto)-naphthalic acid anhydride were dissolved in 250 parts by weight of pyridine and 37 parts by weight of nitrosylsulfuric acid were added dropwise, while stirring, at —10 to —5° C. After half an hour cooling was switched off and the whole was stirred for 2.5 hours at room temperature. To complete the reaction, the reaction mixture was slowly heated to 100 to 115° C. and stirred for 3 hours. The resulting product was filtered-off with suction at room temperature, washed with pyridine until the effluent showed a light yellow colour and then washed with water to remove the pyridine. The ring closure product was dried in a drying cabinet at 100° C. The dyestuff obtained in this manner, which corresponded to the formula

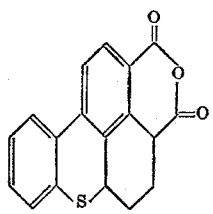

showed an extinction value of 96 to 98% measured photometrically at 465 nm.

The extinction value of this dyestuff, however, was only 85% of that of a chemically pure product, when the dyestuff was prepared according to the method described in German Patent 1,297,259.

A similarly good result was obtained when introducing into pyridine, while cooling, nitrosyl-sulfuric acid and then 4-(2'-aminophenylmercapto)-naphthalic acid anhydride.

We claim:

1. In a process for preparing a benzothioxanthene by diazoting a compound essentially having the structure

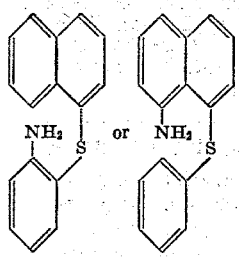

and heating the resulting diazonium salt, the improvement which consists in diazotizing said compound with nitrosyl chloride or nitrosyl sulfuric acid in a tertiary amine at a temperature in the range of from —10° C. to +10° C. and heating the resulting diazonium compound to a temperature in the range of 40° C. to 115° C.

2. Process defined in Claim 1 wherein the diazotizing step is carried out with nitrosyl chloride or nitrosyl sulfuric acid.

3. Process defined in Claim 1 wherein the tertiary amine is pyridine, picoline, quinoline or isoquinoline.

4. A process which comprises diazotizing 3-(2'-aminophenylmercapto)-benzanthrone with nitrosyl chloride or nitrosyl sulfuric acid in a tertiary amine at a temperature in the range of from —10° C. to +10° C. and heating the resulting diazonium compound to a temperature in the range of 40° C. to 115° C.

5. A process which comprises diazotizing 4-(2'-aminophenylmercapto)-naphthalic acid anhydride with nitrosyl chloride or nitrosyl sulfuric acid in a tertiary amine at a temperature in the range of from —10° C. to +10° C. and heating the resulting diazonium compound to a temperature in the range of 40° C. to 115° C.

References Cited

UNITED STATES PATENTS 3,367,937    2/1968    Fuchs et al. _____ 260—281

HENRY R. JILES, Primary Examiner

C. M. S. JAISLE, Assistant Examiner